| (12) | United States Patent | (10) Patent No.: | US 11,870,858 B2 |
|---|---|---|---|
| | Kairali et al. | (45) Date of Patent: | Jan. 9, 2024 |

(54) INTELLIGENT, FAST-FORWARDED HEALTH CHECKS WITHIN SERVICE MESH

(71) Applicant: INTERNATIONAL BUSINESS MACHINES CORPORATION, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 3 days.

(21) Appl. No.: 17/590,334

(22) Filed: Feb. 1, 2022

(65) Prior Publication Data

US 2023/0247099 A1 Aug. 3, 2023

(51) Int. Cl.
*G06F 15/16* (2006.01)
*H04L 67/306* (2022.01)
*H04L 67/104* (2022.01)
*H04L 67/01* (2022.01)

(52) U.S. Cl.
CPC ............ *H04L 67/306* (2013.01); *H04L 67/01* (2022.05); *H04L 67/1051* (2013.01); *H04L 67/1053* (2013.01)

(58) Field of Classification Search
CPC ... H04L 67/306; H04L 67/01; H04L 67/1051; H04L 67/1053
See application file for complete search history.

(56) References Cited

U.S. PATENT DOCUMENTS

| 10,574,736 | B2* | 2/2020 | Kulp | H04L 67/10 |
|---|---|---|---|---|
| 11,388,273 | B2* | 7/2022 | Bomma | H04L 67/306 |
| 2018/0131764 | A1* | 5/2018 | Suter | G06F 9/547 |
| 2018/0146070 | A1* | 5/2018 | Lopushenko | H04L 67/306 |
| 2018/0270107 | A1 | 9/2018 | Nassar | |
| 2019/0057213 | A1* | 2/2019 | Hassan | H04L 41/142 |
| 2019/0332795 | A1* | 10/2019 | Woodward | H04L 67/1097 |
| 2019/0340059 | A1* | 11/2019 | Bagarolo | G06F 8/71 |
| 2020/0310888 | A1* | 10/2020 | Gopalan | G06F 9/54 |
| 2020/0344290 | A1* | 10/2020 | Krishnaswamy | G06F 9/5083 |

(Continued)

FOREIGN PATENT DOCUMENTS

| CN | 107870845 B | 10/2020 |
|---|---|---|
| CN | 110362494 B | 6/2021 |

(Continued)

OTHER PUBLICATIONS

Anonymous. "Implement health check APIs for microservices." Printed Oct. 7, 2021. 4 pages. Published by IBM. https://www.ibm.com/garage/method/practices/manage/health-check-apis/.

(Continued)

*Primary Examiner* — Ario Etienne
*Assistant Examiner* — Thorne E Waugh
(74) *Attorney, Agent, or Firm* — Brian M. Restauro; Jared Montanaro (57) ABSTRACT

A processor may analyze one or more microservice chains based on one or more user profiles. The processor may generate, based on the analyzing, a health status associated with the one or more microservice chains. The processor may determine, based on the health status, whether a microservice in the one or more microservice chains is unhealthy. The processor may implement, automatically, a select microservice chain.

20 Claims, 5 Drawing Sheets

(56) References Cited

U.S. PATENT DOCUMENTS

| | | | |
|---|---|---|---|
| 2020/0344310 A1* | 10/2020 | Todd | H04L 67/60 |
| 2020/0394167 A1* | 12/2020 | Garvey | G06F 12/0815 |
| 2021/0149790 A1* | 5/2021 | Renner | G06F 11/0778 |
| 2021/0203739 A1* | 7/2021 | Calegari | G06F 9/44 |
| 2022/0067814 A1* | 3/2022 | Goncalves | G06N 20/00 |
| 2022/0078091 A1* | 3/2022 | Qiu | H04L 41/5012 |
| 2022/0253574 A1* | 8/2022 | Polaji | G06N 20/00 |
| 2023/0235495 A1* | 7/2023 | Miles | G06V 20/60 |
| | | | 8/137 |

FOREIGN PATENT DOCUMENTS

| | | | | |
|---|---|---|---|---|
| CN | 112612675 B | * | 2/2023 | G06F 11/3006 |
| WO | 2020211222 A1 | | 10/2020 | |
| WO | 2021008031 A1 | | 1/2021 | |

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

\* cited by examiner

INTELLIGENT, FAST-FORWARDED HEALTH CHECKS WITHIN SERVICE MESH

BACKGROUND

The present disclosure relates generally to the field of service mesh, and more specifically to intelligent and fast-forwarded health checks within service mesh.

The replacement of legacy services to microservices philosophy has put forward a lot of new challenges. For instance, a large amount of data, and learning data, may get transferred between a large array of microservices in a cloud based environment.

SUMMARY

Embodiments of the present disclosure include a method, computer program product, and system for intelligent and fast-forwarded health checks within service mesh. A processor may analyze one or more microservice chains based on one or more user profiles. The processor may generate, based on the analyzing, a health status associated with the one or more microservice chains. The processor may determine, based on the health status, whether a microservice in the one or more microservice chains is unhealthy. The processor may implement, automatically, a select microservice chain.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of service mesh, and more specifically to intelligent and fast-forwarded health checks within service mesh. While the present disclosure is not necessarily limited to such applications, various aspects of the disclosure may be appreciated through a discussion of various examples using this context.

The replacement of legacy services to microservices philosophy has put forward a lot of new challenges. For instance, a large amount of data, and learning data (e.g., information derived from/associated with machine learning, information related to correlations between microservices/microservice chains, etc.), may get transferred between a large array of microservices in a cloud based environment.

As an example of the issues to be faced, Microservice 1 may transfer a huge dataset to Microservice 2, and then Microservice 2 to Microservice 3, and Microservice 3 to Microservice 4. If Microservice 4 is not healthy, the transfer may fail at Microservice 3. However, by the time of the failure, the network would have already expended time and resources to the transferring and processing required of the huge dataset at Microservice 2. This issue continues to increase when the length of a microservice chain is higher (e.g., Microservice 5 . . . Microservice N).

It is noted that the "health" of a microservice may be determined by a microservice providing information related to their functioning to a monitoring service and/or orchestrator. Further, the "health" of the microservice may indicate that a microservice is working properly (e.g., healthy) or not (e.g., unhealthy). For instance, if a microservice is "healthy" it may be working properly and processing/performing a transaction correctly, whereas a microservice may be "unhealthy" if it is not working properly and is not processing/performing a transaction correctly.

Disclosed herein is a solution to prevent the issues and/or prevent a loss in network time and resources, as discussed above. In some embodiments, a processor, or a system, may check, whether in a microservice chain, a call will land to/at an unhealthy microservice. If yes, the processor may block the call/transaction at the entry-level microservice (e.g., the first microservice in a microservice chain, at the unhealthy microservice, etc.) based on a user profile. In some embodiments, the processor may also check whether, by the time the call reaches the unhealthy microservice, the probability of the unhealthy microservice's health getting restored. If the probably of restoration is high, the processor may keep sending data to the next microservice in the chain (e.g., Microservice 3 in a microservice chain of 6 may be unhealthy, but it may be determined that Microservice 3 will be healthy by the time data is processed from Microservice 1 to Microservice 2, accordingly, data may be sent to Microservice 4 instead of being stopped at Microservice 3). In some embodiments, the process may also check whether any microservice/service may become unhealthy based on analysis of resource graphs, and if predicted that by the time the transaction reaches the unhealthy microservice, the processor may prevent the call to that microservice in the chain (and/or subsequent microservices in the chain after the unhealthy microservice).

Turning now to an in-depth example in regard to the proposed solution (e.g., method, system, and/or computer program product). In some embodiments, the proposed solution can be implemented as an extension to service mesh architecture. In some embodiments, the service mesh (or processor of/associated with the service mesh) may keep track of all the possible microservice chains per user profile, where the user profile(s) may be associated with a user of a service/microservice application. The service mesh may also keep track of a data size and data processing time that has been sent between microservices in the mesh per user profile.

The service mesh, over a period of time, may build a heuristic database that may allow health status check following data for all microservices. Some heuristics may be, but are not limited to: resource statistics (e.g., which computing resources are being used for processing a call/transaction, how many computing resources are being used by the service mesh for a particular microservice chain, etc.), time-of-day based health status (e.g., Microservice 1 is optimal at midday, Microservice 2 is optimal at night, Microservice 3 is suboptimal at night, etc.), average time for a microservice to get back to a healthy status once it moves to an unhealthy condition/status, etc. The service mesh may also record usual processing and network time between each microservice.

In some embodiments, the proposed solution provides an intelligent fast-forwarding of microservice health statuses in a microservice chain based on user profile(s). As an example, a possible microservice chain may be M1→M2→M3→M4, where M4 is currently unhealthy. Based on historical analysis, it may be determined/identified that: User 1 data reaches M1→M2→M3→M4 and User 2 data reaches M1→M2→M3. Accordingly, the service mesh will block User 1 at M1 itself, whereas User 2 transactions will be allowed based on this learning (e.g., historical analysis).

In some embodiments, the proposed solution provides an intelligent discarding of fast-forwarded health statuses in a microservice chain based on user profile(s) and processing time(s). As an example, a possible microservice chain may be M1→M2→M3→M4, where M4 is currently unhealthy. Based on historical analysis, it may be determined/identified that: User 1 data reaches M1→M2→M3→M4 and User 2 data reaches M1→M2→M3→M4. Further based on the historical analysis, User 1 data may historically reach M4 in 10 minutes and User 2 data may historically reach M4 in 2 minutes, additionally M4 may attain a health status from an unhealthy state in 5 minutes on average. Accordingly, the service mesh may allow transactions of User 1 and deny transactions of User 2.

In some embodiments, the proposed solution provides an intelligent discarding of fast-forwarded health status in a microservice chain based on user profile(s), processing time(s), and heath prediction(s). As an example, a possible microservice chain may be M1→M2→M3→M4, where M4 is currently unhealthy and based on resource graph it may become unhealthy in 5 minutes. Based on historical analysis, it may be determined/identified that: User 1 data reaches M1→M2→M3→M4 in 10 minutes and User 2 data reaches M1→M2→M3→M4 in 2 minutes. Accordingly, the service mesh may deny transactions of User 1 and allow transactions of User 2.

Figure 1:
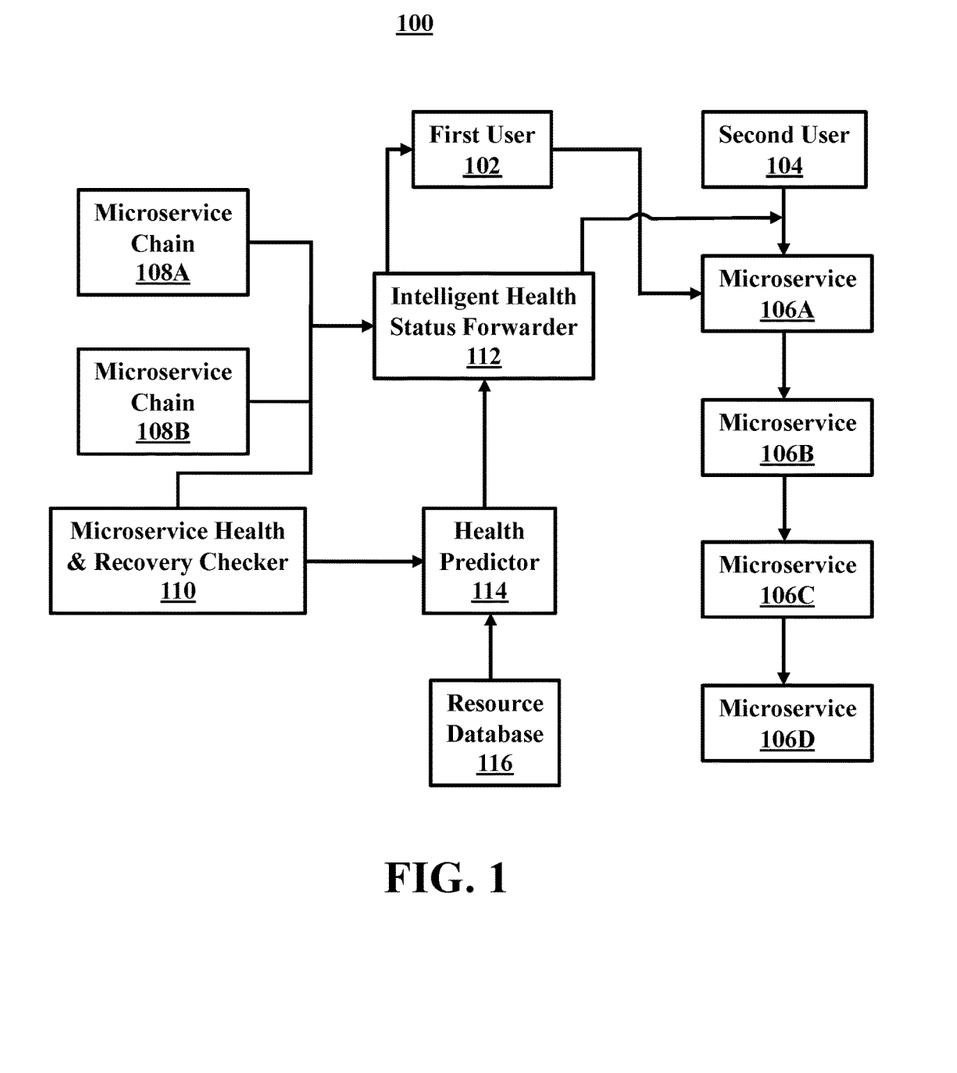
FIG. 1 illustrates a block diagram of an example system for intelligent and fast-forwarded health checks within service mesh, in accordance with aspects of the present disclosure.

Referring now to FIG. 1, illustrated a block diagram of an example system 100 for intelligent and fast-forwarded health checks within service mesh, in accordance with aspects of the present disclosure. As depicted, system 100 includes a first user 102, a second user 104, microservices 106A-D, microservice chains 108A-B, a microservice health and recovery checker 110, an intelligent health status forwarder 112, a health predictor 114, and a resource database 116. In some embodiments, the system 100 may function in any matter disclosed throughout this disclosure, however, for ease of understanding, the system 100 is depicted as described below.

In some embodiments, the first user 102 and the second user 104 may subscribe to a microservices 106A-D (which may be construed as a microservice chain). In order to determine if data associated with either the first user 102 and/or the second user 104 should reach each of the microservices 106A-D, the system may utilize the intelligent health status forwarder 112. The intelligent health status forwarder 112 may pull, be pushed, or otherwise access information associated with microservice chains 108A-B, microservice health and recovery checker 110, and/or the health predictor 114.

In some embodiments, the microservice chain 108A may include (historical/learning) information associated with microservice chains (such as that which would incorporate microservices 106A-D), such as information per user profile (e.g., associated with first user 102 and/or second user 104) and per API call. In some embodiments, the microservice chain 108A may include (historical/learning) information associated with microservice chains (such as that which would incorporate microservices 106A-D), such as average processing time per user profile of the microservice chains.

In some embodiments, the microservice health and recovery checker 110 may include (historical/learning) information associated with each microservice's (e.g., 106A-D) health status and recovery time per a time of day. In some embodiments, the health predictor 114 may using learning data associate with all microservices and chains within the system 100 (e.g., including not only microservices 106A-D, but also those not depicted). In some embodiments, the health predictor 114 may receive its learning data from the microservice health and recovery checker 110 and/or the resource database 116, which may include resource statistics, such as, which resources are used by which microservices (e.g., 106A-D) within the system 100.

In some embodiments, the health predictor 114 may provide, to the intelligent health status forwarder 112, estimates/predictions (as a percentage) as to whether a microservice (e.g., 106A-D) will remain healthy and/or if the microservice (e.g., 106A-D) will recover from an unhealthy state before information is to be processed by an unhealthy microservice.

As an example, microservice 106D may be unhealthy and it is predicted that it will be healthy within 5 minutes, however, it will take 2 minutes for data from the first user 102 to reach microservice 106D and 8 minutes for data from the second user 104 to reach microservice 106D. Accordingly, the intelligent health status forwarder 112, may block the data from the first user 102 from either reaching microservice 106D or from entering a microservice chain by blocking the data from reaching/entering microservice 106A. Additionally, the intelligent health status forwarder 112 may allow the data from the second user 104 to reach the microservice 106D and/or enter a microservice chain at microservice 106A, in general.

Figure 2:
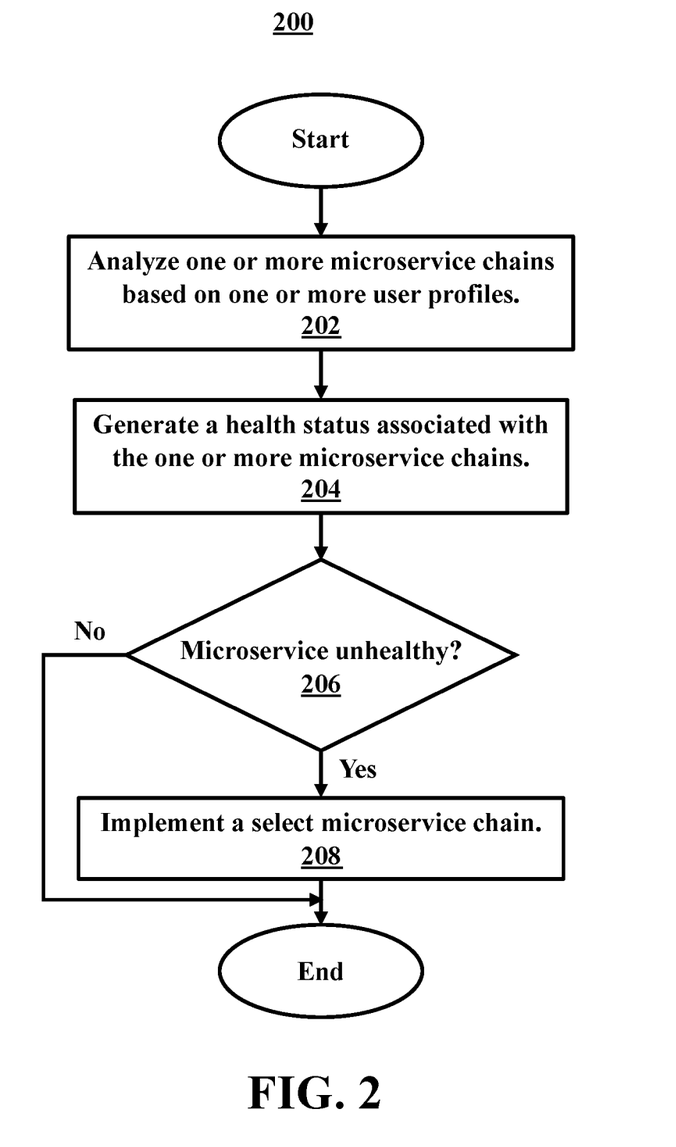
FIG. 2 illustrates a flowchart of an example method for intelligent and fast-forwarded health checks within service mesh, in accordance with aspects of the present disclosure.

Referring now to FIG. 2, illustrated is a flowchart of an example method 200 for intelligent and fast-forwarded health checks within service mesh, in accordance with aspects of the present disclosure. In some embodiments, the method 200 may be performed by a processor (e.g., of system 100 of FIG. 1, etc.).

In some embodiments, the method 200 begins at operation 202, where the processor analyzes one or more microservice chains based on one or more user profiles. In some embodiments, the method 200 proceeds to operation 204, where the processor generates, based on the analyzing, a health status associated with the one or more microservice chains.

In some embodiments, the method 200 proceeds to decision block 206, where the processor determines, based on the health status, whether a microservice in the one or more microservice chains is unhealthy. In some embodiments, if, at decision block 206, it is determined that a microservice (or all microservices) in the one or more microservice chains is/are healthy, the method 200 may end. In some embodiments, if, at decision block 206, it is determined that a microservice (or at least one microservice) in the one or more microservice chains is unhealthy, the method 200 proceeds to operation 208. At operation 208, the processor implements, automatically, a select microservice chain. In some embodiments, after operation 208, the method 200 may end.

In some embodiments, discussed below, there are one or more operations of the method 200 not depicted for the sake of brevity and which are discussed throughout this disclosure. Accordingly, in some embodiments, analyzing the one or more microservice chains based on the one or more user profiles may include the processor analyzing the one or more microservice chains based on a processing time.

In some embodiments, analyzing the one or more microservice chains based on the one or more user profiles may include the processor analyzing the one or more microservice chains based on a processing time and a health prediction (e.g., as based on learning/historical data, for example, the microservice is usually unhealthy at 2 pm each day, etc.).

In some embodiments, the processor may identify possible microservice chains per each of the one or more user profiles. In some embodiments, the processor may analyze a data size and a processing time (e.g., data processing time) associated with microservices communicating within the possible microservice chains.

In some embodiments, the processor may generate based on the analyzing of the data size and the processing time, a heuristic database. The processor may store resource statistics, time-of-day based health statuses, and average time back to healthy statuses associated with the possible microservice chains in the heuristic database.

In some embodiments, the processor may process an actual processing time and a network time between the microservices communicating within the possible microservice chains. The processor may store the actual processing time and the network time in the heuristic database (e.g., for historical analysis, machine-learning updates, etc.).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
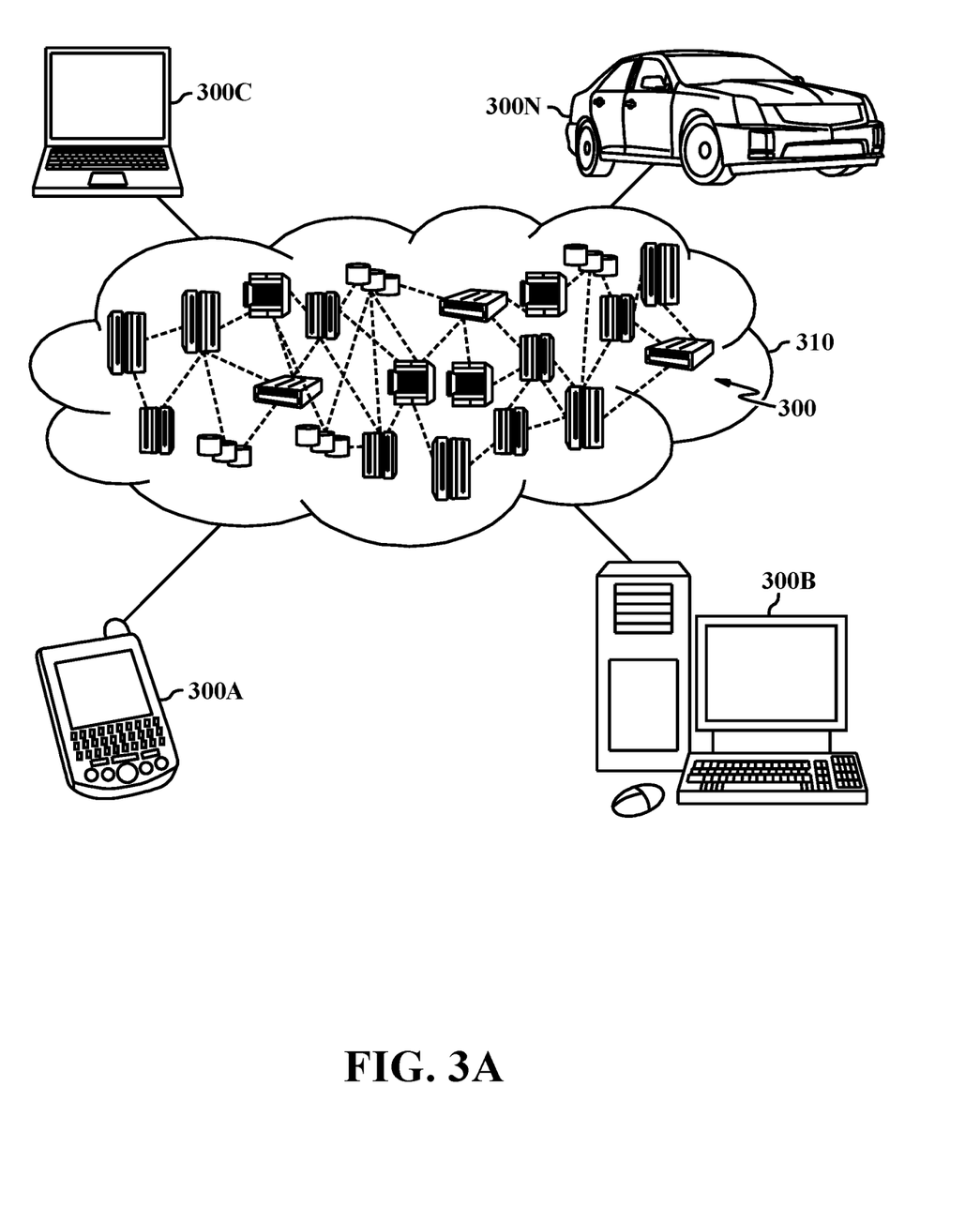
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
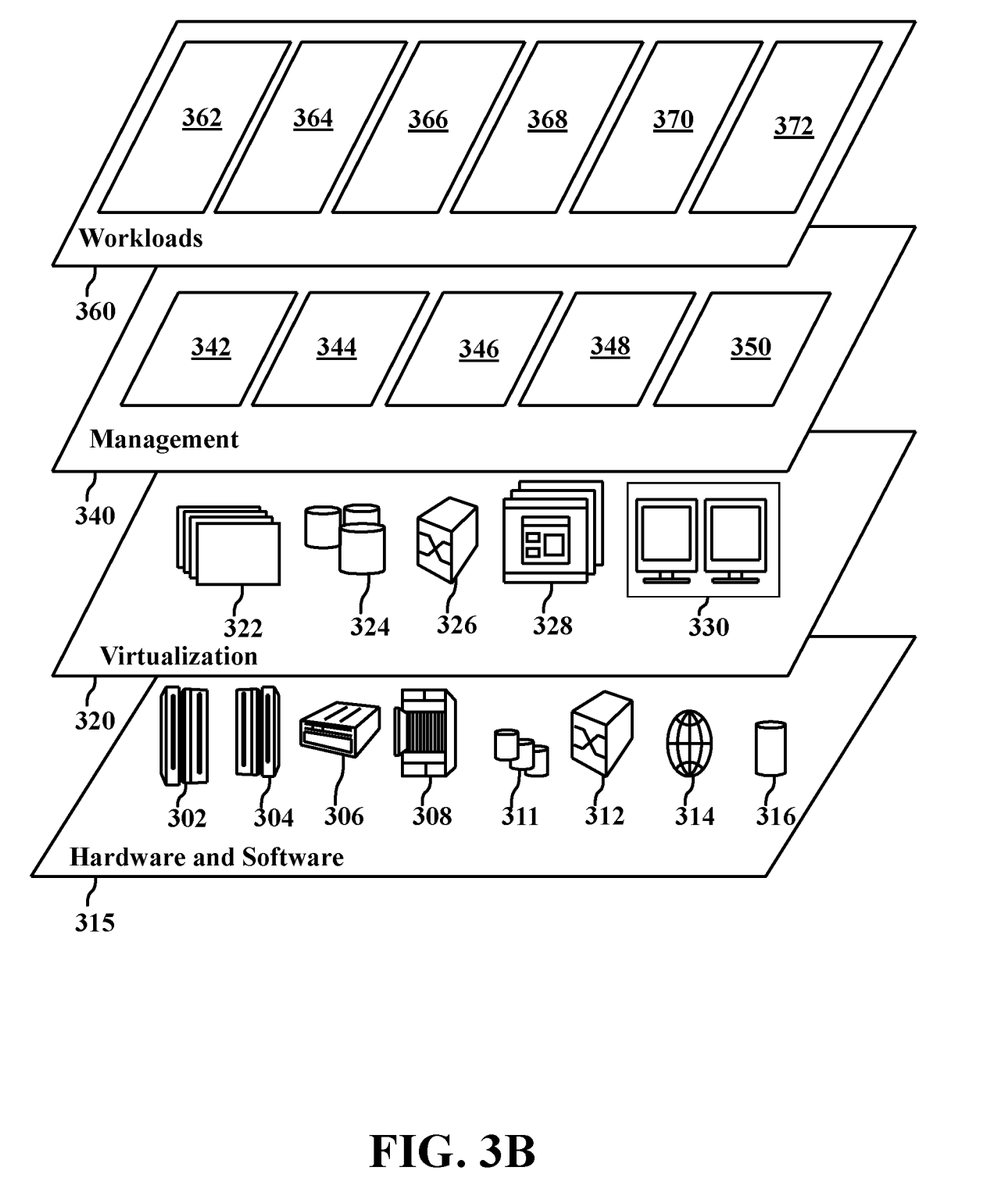
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and intelligent, fast-forwarded health checks 372.

Figure 4:
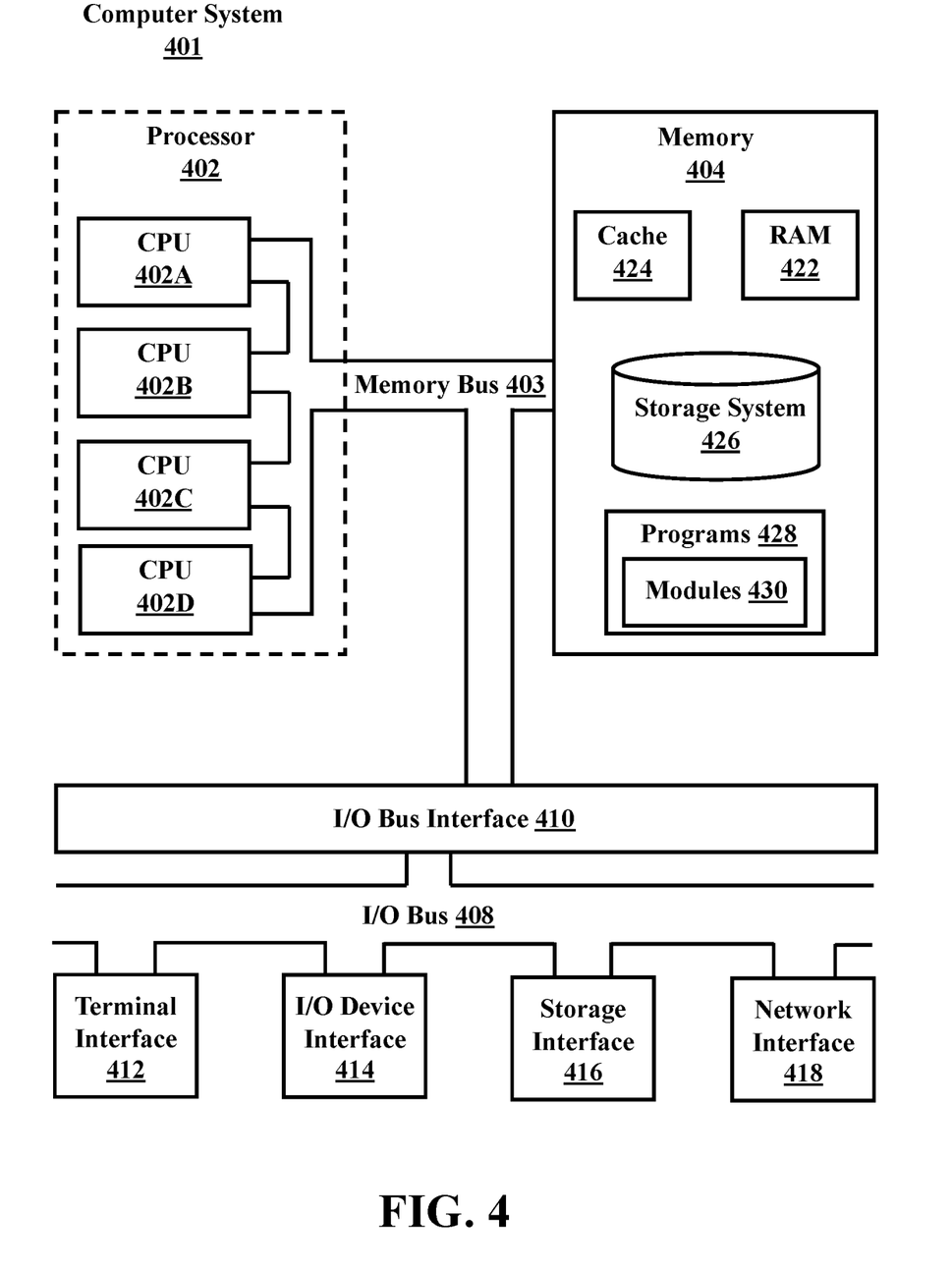
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for intelligent and fast-forwarded health checks within service mesh, the system comprising:
   a memory; and
   a processor in communication with the memory, the processor being configured to perform operations comprising:
   analyzing one or more microservice chains based on one or more user profiles;
   generating, based on the analyzing, a health status associated with the one or more microservice chains;
   determining, based on the health status, whether a microservice in the one or more microservice chains is unhealthy; and
   implementing, automatically, a select microservice chain.

2. The system of claim 1, wherein analyzing the one or more microservice chains based on the one or more user profiles further includes:
   analyzing the one or more microservice chains based on a processing time.

3. The system of claim 1, wherein analyzing the one or more microservice chains based on the one or more user profiles further includes:
   analyzing the one or more microservice chains based on a processing time and a health prediction.

4. The system of claim 1, wherein the processor is further configured to perform operations comprising:
   identifying possible microservice chains per each of the one or more user profiles.

5. The system of claim 4, wherein the processor is further configured to perform operations comprising:
   analyzing a data size and a processing time associated with microservices communicating within the possible microservice chains.

6. The system of claim 5, wherein the processor is further configured to perform operations comprising:
   generating, based on the analyzing of the data size and the processing time, a heuristic database; and
   storing resource statistics, time-of-day based health statuses, and average time back to healthy statuses associated with the possible microservice chains in the heuristic database.

7. The system of claim 6, wherein the processor is further configured to perform operations comprising:
   processing an actual processing time and a network time between the microservices communicating within the possible microservice chains; and
   storing the actual processing time and the network time in the heuristic database.

8. A computer-implemented method for intelligent and fast-forwarded health checks within service mesh, the method comprising:
   analyzing, by a processor, one or more microservice chains based on one or more user profiles;
   generating, based on the analyzing, a health status associated with the one or more microservice chains;
   determining, based on the health status, whether a microservice in the one or more microservice chains is unhealthy; and
   implementing, automatically, a select microservice chain.

9. The computer-implemented method of claim 8, wherein analyzing the one or more microservice chains based on the one or more user profiles further includes:
   analyzing the one or more microservice chains based on a processing time.

10. The computer-implemented method of claim 8, wherein analyzing the one or more microservice chains based on the one or more user profiles further includes:
    analyzing the one or more microservice chains based on a processing time and a health prediction.

11. The computer-implemented method of claim 8, further comprising:
identifying possible microservice chains per each of the one or more user profiles.

12. The computer-implemented method of claim 11, further comprising:
analyzing a data size and a processing time associated with microservices communicating within the possible microservice chains.

13. The computer-implemented method of claim 12, further comprising:
generating, based on the analyzing of the data size and the processing time, a heuristic database; and
storing resource statistics, time-of-day based health statuses, and average time back to healthy statuses associated with the possible microservice chains in the heuristic database.

14. The computer-implemented method of claim 13, further comprising:
processing an actual processing time and a network time between the microservices communicating within the possible microservice chains; and
storing the actual processing time and the network time in the heuristic database.

15. A computer program product for intelligent and fast-forwarded health checks within service mesh comprising a computer readable storage medium having program instructions embodied therewith, the program instructions executable by a processor to cause the processor to perform operations, the operations comprising:
analyzing one or more microservice chains based on one or more user profiles;
generating, based on the analyzing, a health status associated with the one or more microservice chains;
determining, based on the health status, whether a microservice in the one or more microservice chains is unhealthy; and
implementing, automatically, a select microservice chain.

16. The computer program product of claim 15, wherein analyzing the one or more microservice chains based on the one or more user profiles further includes:
analyzing the one or more microservice chains based on a processing time.

17. The computer program product of claim 15, wherein analyzing the one or more microservice chains based on the one or more user profiles further includes:
analyzing the one or more microservice chains based on a processing time and a health prediction.

18. The computer program product of claim 15, wherein the processor is further configured to perform operations comprising:
identifying possible microservice chains per each of the one or more user profiles.

19. The computer program product of claim 18, wherein the processor is further configured to perform operations comprising:
analyzing a data size and a processing time associated with microservices communicating within the possible microservice chains.

20. The computer program product of claim 19, wherein the processor is further configured to perform operations comprising:
generating, based on the analyzing of the data size and the processing time, a heuristic database; and
storing resource statistics, time-of-day based health statuses, and average time back to healthy statuses associated with the possible microservice chains in the heuristic database.

* * * * *